United States Patent [19]

Barclay

[11] Patent Number: 4,763,432

[45] Date of Patent: Aug. 16, 1988

[54] FISHNET HANGING SYSTEM

[76] Inventor: Robert W. Barclay, 4710 University Way N.E. #712, Seattle, Wash. 98105

[21] Appl. No.: 762,003

[22] Filed: Aug. 2, 1985

[51] Int. Cl.[4] ............................................. A01K 93/00
[52] U.S. Cl. ............................................. 43/7; 43/10
[58] Field of Search ............ 43/7, 10, 101, 102, 43/105, 44.91, 44.95; 24/16 PB, 335, 341, 116 A, 542, 543; 403/78, 76, 165; 114/240 E, 240 C, 241

[56] References Cited

U.S. PATENT DOCUMENTS

| | | | |
|---|---|---|---|
| 822,694 | 6/1906 | Shepherd | 43/44.91 |
| 1,333,224 | 3/1920 | Sperry | 114/240 E |
| 3,013,356 | 12/1961 | Luketa | 43/43.1 |
| 3,165,853 | 1/1965 | Ansell | 43/7 |
| 3,213,560 | 10/1965 | Phillips | 43/7 |
| 3,545,120 | 12/1970 | Takaoka | 43/10 |
| 3,851,979 | 12/1974 | Becker | 403/76 |
| 3,955,305 | 5/1976 | Roberts | 43/44.91 |
| 4,378,617 | 4/1983 | Burns | 24/543 |
| 4,510,650 | 4/1985 | Espinoza | 24/16 PB |

FOREIGN PATENT DOCUMENTS 672589 10/1963 Canada ..................................... 43/7

Primary Examiner—Kurt Rowan
Attorney, Agent, or Firm—Ward Brown; Robert W. Beach

[57] ABSTRACT

A hanging cord is threaded through the top selvage of the net or web of a fishnet assembly and is secured at regularly spaced locations to separate anchor blocks which, in turn, are secured to the fishnet corkline. The anchor blocks have rigid bodies and swingable connectors with arms projecting from the block bodies for attachment of the hanging cord to the connector arms, such as by clips clamping the hanging line and having pins fitted through eyes in the arms. The securing of the anchor blocks to the corkline can be by straps threaded through the block bodies and tightenable to clamp the blocks to the corkline. The bottom selvage of the net can be connected to the lead line in the same manner by threading a separate hanging cord through the bottom selvage and securing it at regularly spaced intervals to corresponding anchor blocks clamped to the lead line.

5 Claims, 6 Drawing Sheets

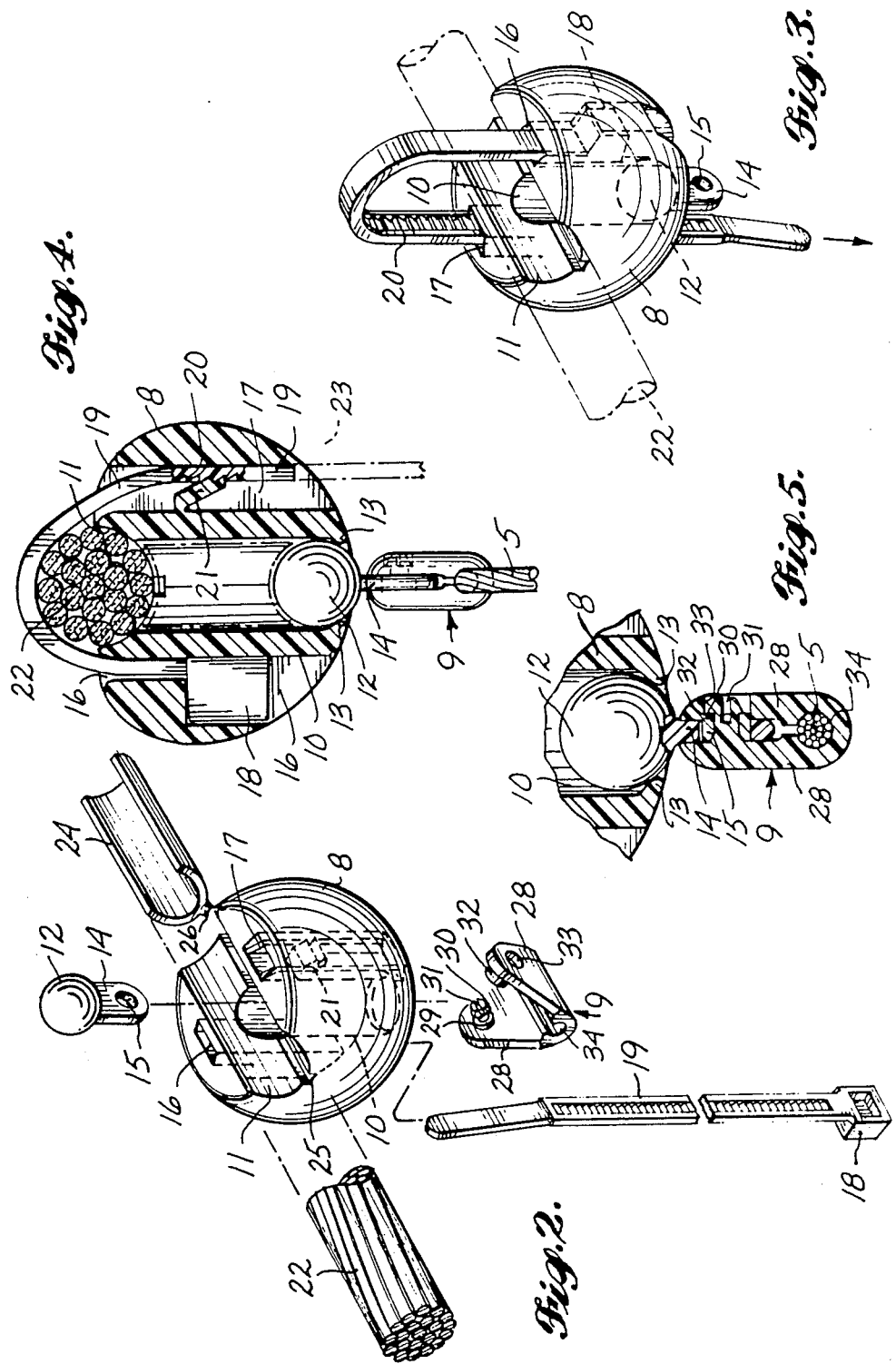

U.S. Patent   Aug. 16, 1988   Sheet 3 of 6   4,763,432
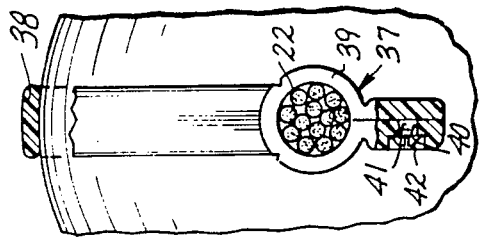
Fig. 7.
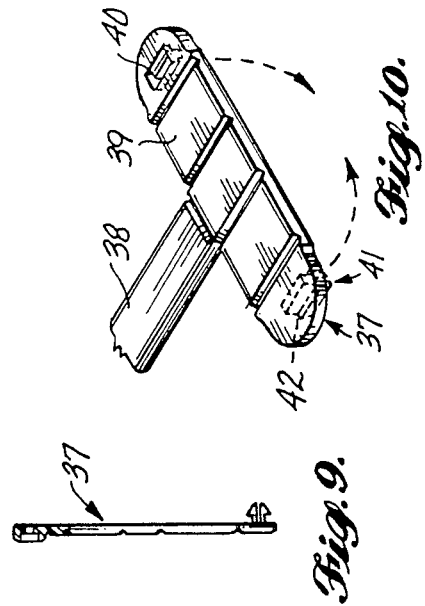
Fig. 10.
Fig. 9.
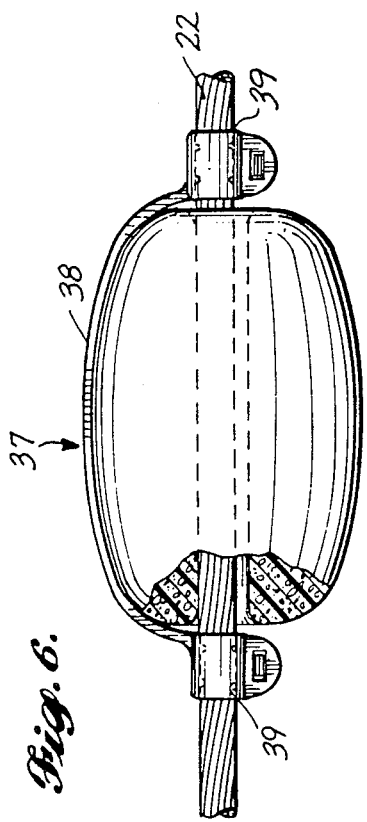
Fig. 6.
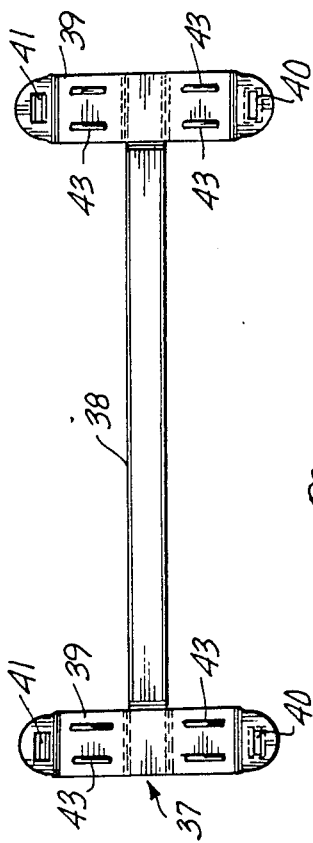
Fig. 8.

FISHNET HANGING SYSTEM

BACKGROUND OF THE INVENTION

1. Field of the Invention

The present invention relates to anchor mechanism for attachment to a cylindrical length, and particularly to mechanism for coupling the top and bottom selvages of a fishnet to a corkline and a lead line, respectively.

2. Prior Art

Known gill nets have a top corkline consisting of a rope carrying spaced floats, a bottom lead line, usually a rope with internal weights, and a central net or web. The top and bottom selvages of the web are connected, respectively, to the corkline and lead line by separate hanging cords. To prevent bunching of the net, the hanging cords must be securely knotted to the corkline and lead line at substantially uniformly spaced locations.

The completed setup or shackel of gill net can be large. For example, for salmon fishing in the Bristol Bay area of Alaska the completed shackel can be 50 fathoms (76.2 meters) long and 5 to 10 fathoms (7.6 to 15.2 meters) deep. The web itself can be rolled or folded to compact condition, but the lead line and particularly the corkline are bulky.

The mesh size of the web desired depends on size and species of the fish to be caught. Again using the example of salmon fishing in Bristol Bay, different webs may be desired for reds (sockeye), pinks (chum), silvers (Coho) and kings (Chinook). Changing webs on short notice, such as before the next tide change, may result in a greatly increased catch.

Government regulations and storage space may limit the number of complete shackels available on board, and fishing may be conducted in an area remote from shore storage or even from a tender where additional shackels might be kept. There also is substantial additional expense in acquiring, maintaining and storing additional shackels for the purpose of having webs of different mesh size conveniently available, as compared to hanging different webs from the same corkline and lead line.

For known hanging systems, it is a complicated and time-consuming process to uncouple a web from its corkline and lead line and rehang a new web. In addition, damage can occur to the corkline, web or lead line even when such process is performed by an experienced worker. Further, the time lost in changing webs can be extremely frustrating to a fisherman, particularly considering the shorter fishing seasons that can be imposed by the government.

SUMMARY OF THE INVENTION

The system in accordance with the present invention utilizes separate anchor blocks substantially permanently and immovably attachably to a cylindrical length or line at uniformly spaced locations, such as to an otherwise conventional corkline or lead line. Separate hanging cords can be quickly and easily attached to the anchor blocks, such hanging cords being threaded through loops of the top and bottom selvages of a net or web. The attaching mechanism can include connectors carried by the anchor blocks and plastic clips for clamping the hanging cord at desired locations and securable to the connectors. The attachment of the connectors to the anchor blocks can allow universal swiveling movement of the connectors and clips relative to the blocks.

In an alternative embodiment, the hanging cords themselves can be threaded through eyes of the connectors and separate clips are provided to clamp each loop of hanging cord at opposite sides of the connector. In either embodiment, preferably sliding movement of the hanging cord relative to the individual anchor blocks is prevented by the clips.

The system is used for quickly and reliably coupling a fishnet or web to the corkline or lead line, using simple and inexpensive but durable components, and is usable by unskilled workers while still resulting in a uniform and reliable hanging of the web. The system also allows the web to be uncoupled from the corkline and lead line quickly and easily but does not result in damage to the reusable components of the fishnet setup or shackel when the web is uncoupled. The system is adaptable for fishing in heavy seas and for compact storage without tangling.

BRIEF DESCRIPTION OF THE DRAWINGS

FIG. 2 is a top perspective of components of the system of FIG. 1 with parts shown in exploded relationship; and FIG. 3 is a corresponding top perspective with such parts partially assembled.

FIG. 4 is a somewhat diagrammatic, vertical, transverse section along line 4—4 of FIG. 3 with the parts completely assembled; and FIG. 5 is a vertical transverse section corresponding to FIG. 4 but on a larger scale with parts broken away.

FIG. 6 is a side elevation of another component, namely, a float retainer, of the fishnet hanging system of FIG. 1 with parts broken away; and FIG. 7 is an enlarged, fragmentary, end elevation of the float retainer of FIG. 6 with parts broken away.

FIG. 8 is a bottom plan of the retainer of FIG. 6; FIG. 9 is an end elevation of the retainer of FIG. 6; and FIG. 10 is a fragmentary, somewhat diagrammatic, top perspective of the retainer of FIG. 6.

DETAILED DESCRIPTION

Figure 1:
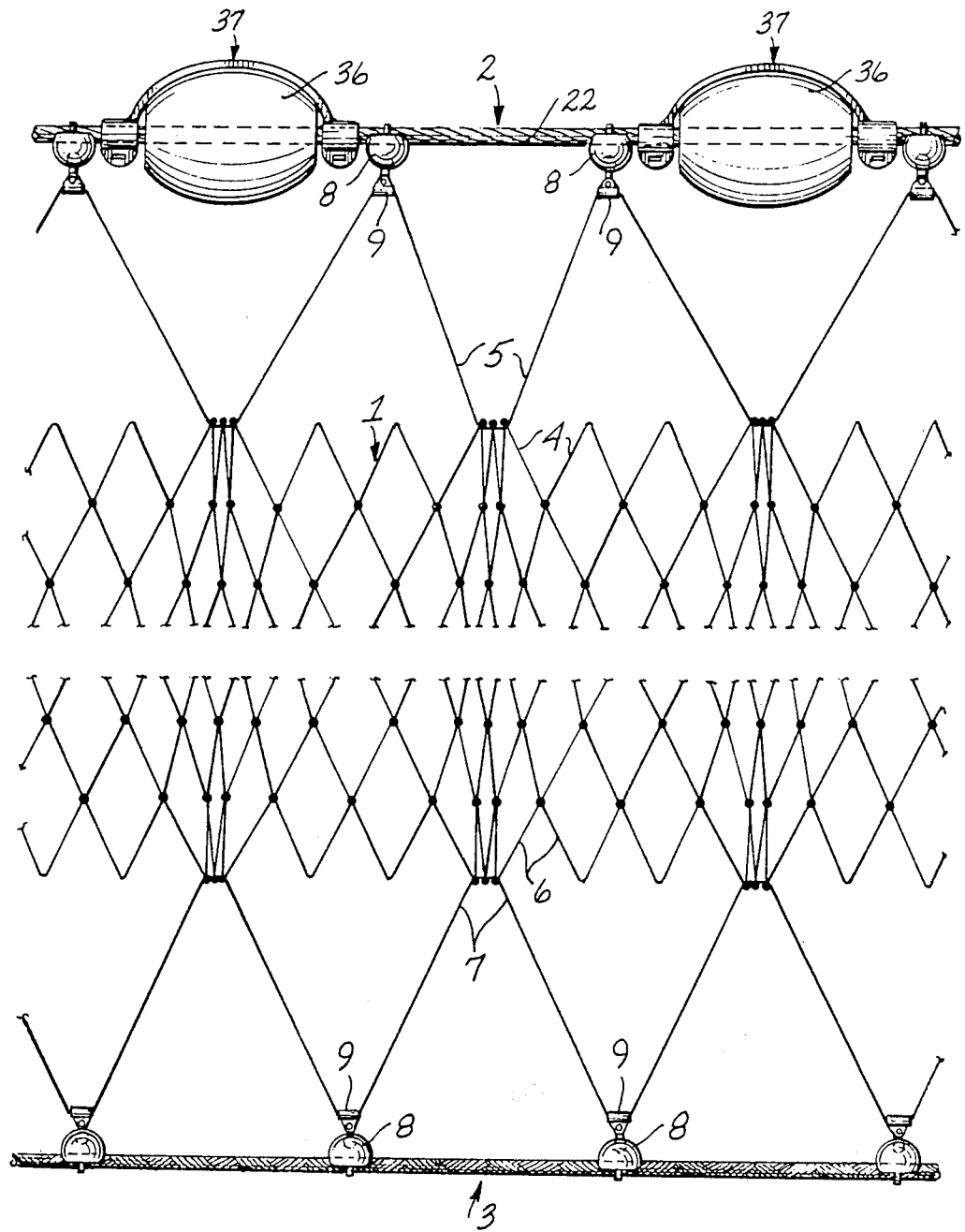
FIG. 1 is a fragmentary, somewhat diagrammatic, side elevation of a shackel of fishing gear utilizing a fishnet hanging system in accordance with the present invention.

As shown in FIG. 1, the fishnet hanging system in accordance with the present invention is preferably used to couple a conventional net or web 1 to cylindrical lengths or lines, namely, a conventional top corkline 2 and a conventional bottom lead line 3. In general, the top selvage 4 of web 1 is coupled to the corkline by a separate hanging cord 5 which is threaded through selected loops of such selvage and firmly connected to the corkline at uniformly spaced locations, and the bottom selvage 6 of the web is coupled to the lead line by a separate hanging cord 7 threaded through selected loops of selvage 6 and firmly connected to the lead line at uniformly spaced locations.

As thus far described, the hanging system is conventional. In the past, the appropriate hanging cord would be threaded through the selected loop or loops of selvage and be securely knotted to the corkline or lead line, then threaded through the next selected loop or loops of selvage, and so on—a time-consuming process requiring experience to assure a reliable coupling of the web to the corkline and lead line. To remove the web, it was necessary to cut each individual knot of hanging cord at the corkline or lead line which, even if conducted carefully, could result in advertently cutting or at least nicking the corkline or lead line.

To simplify and speed up the procedure of coupling the web to the corkline and lead line, the present invention uses separate anchor blocks 8 which can be quickly and easily secured to the corkline and lead line at the desired uniformly spaced locations and which, once secured, are intended to be permanent additions to their lines. Disposable clips 9 are coupled to the anchor blocks 8 and clamp the hanging cords between adjacent loops through which the hanging cords are threaded.

The construction of the anchor blocks 8 is best seen in FIGS. 2 through 5. Each block is a generally spherical body having a central, upright, through bore 10 and an arcuate, preferably semicylindrical, horizontally extending notch or cutout 11 in its top. A connector ball 12 of a diameter only slightly less than the diameter of the anchor block bore 10 is fitted downward into the bore and seats against an annular lip 13 projecting inward from the bottom margin of the bore. Ball 12 has a downward-projecting arm 14 with an eye 15 located below the anchor block when the ball is inserted.

As best seen in FIG. 4, the anchor block 8 also has upright through slots 16 and 17 at opposite sides of its central bore 10 and the arcuate concave cutout 11. The bottom end portion of the slot 16 at one side is larger than its top portion for receiving the enlarged head 18 of a conventional plastic cable tie having a long flexible tail 19 with ratchet teeth 20 on one of its flat surfaces. The slot 17 at the other side is of substantially uniform cross section, but a ratchet finger or pawl 21 integral with the remainder of the anchor block projects downward and outward from the inner wall of slot 17.

As also best seen in FIG. 4, preferably the radius of curvature of the concave cutout 11 is approximately the same as the radius of the corkline rope 22 so that the rope can be fitted snugly into such cutout. To secure the anchor block to the rope, the cable tie tail 19 is threaded upward through slot 16 and is wrapped over the top of the corkline rope, and then is inserted downward through slot 17 as illustrated in FIG. 3. The free end portion of the tail is pulled tight and its inner ratchet teeth 20 slide successively past the inner ratchet arm or pawl 21 which has complemental teeth at its outer end. As diagrammatically indicated in FIG. 4, with such tail 19 under substantial tension, the tail is cut close to the bottom periphery of the anchor block 8, such as at the location of the broken line 23. Because plastic cable ties are somewhat resilient, the cut end of the tail snaps back into the slot 17. The upper portion of the tail 19 looped over the float line rope 22, however, is retained under tension by the inner locking of pawl 21 with the tie ratchet teeth 20 so that the anchor block is immovable relative to the float line rope 22.

As indicated in FIG. 2, to accommodate a rope of lesser diameter, a semicylindrical insert 24 can be fitted into the arcuate anchor block cutout 11. Preferably such cutout has a bottom groove 25 to receive a downward-extending projection or key 26 of the insert 24. In some applications, the corkline rope is of larger diameter than the lead line rope, so that anchor blocks without the inserts 24 would be used for securing the blocks to the corkline rope but blocks with the inserts 24 would be used for the lead line.

As shown in FIG. 1, preferably the anchor blocks 8 are secured to the corkline 2 and lead line 3 as described above at substantially uniformly spaced locations, such as every 7 or 8 inches (17.78 cm or 20.32 cm), and the hanging cords 5 and 7 passing through the selected loops of web selvages 4 and 6 are coupled to the connector balls carried in the blocks by plastic clips 9 shown in greater detail in FIGS. 2, 4 and 5. Each clip is of generally U shape with upward-projecting wings 28. One of such wings has an inward-projecting pin 29 with an enlarged head 30 split by a transverse slot 31 in its end. The other wing has an annular inward-projecting boss 32 with a central through bore opening into a larger cylindrical recess 33 in the outer side of such wing. The return bent base section of the clip is shaped to form a generally cylindrical passage 34 between the wings.

As seen in FIG. 5 with the appropriate hanging cord, line 5 as shown in FIG. 5, fitted in the base passage 34 of a clip 9, the clip can be arranged with the boss 32 received in the eye 15 of the ball arm 14 projecting from one of the anchor blocks 8. The clip wings 28 are forced together so that the split head 30 of the inward-projecting pin 29 is forced through the boss. Preferably the end of the head is flared and its opposite sides are squeezed together as they pass through the boss. When the head passes beyond the bore of the boss into the clip recess 33, the opposite sides of the head spring outward to lock the clip to the ball arm 14. With the clip wings held together the diameter of the passage 34 is less than the usual outer diameter of the hanging cord so that the hanging cord is clamped securely and cannot slide relative to the clip. In addition, the inner sides of the clip passage 34 can be formed with ribs or teeth that embed in the hanging cord to further assure that it will not slide relative to the clip.

Because of the connection of the clips 9 to the arms 14 of balls 12, the clips can swivel universally relative to the anchor blocks 8 which, themselves, are substantially rigidly secured to the corkline and lead line ropes. Movement of the balls longitudinally of the anchor block bores 10 is limited by engagement of the upward-projecting clip wings 28 with the bottom margins of the bores. Nevertheless, attachment of the clips to the ball arms 14 may be somewhat easier if longitudinal movement of the balls in their bores is even more limited which can be accomplished by use of a cylindrical insert 35 that is fitted into the block bore 10 over the top of the ball 12 prior to securing the anchor block to its corkline or lead line, as shown in broken lines in FIG. 4.

It is important that there be no sharp corners or projections on the hanging system components on which the web could catch or become tangled when the completed shackel is rolled onto a drum or folded for storage or when the web is thrown onto the corkline in heavy seas. All exposed surfaces of clip 9 are rounded; the end of the clip pinhead is at most flush with the outer side of the clip; the periphery of each anchor block is substantially spherical; the enlarged cable tie head 18 is recessed into its anchor block so that its outer end is no more than flush with the periphery of the block; the cable tie tail is thin and tightly wrapped over the top of its line (in fact slightly indented into the line); and the free end of the cable tie tail 19 is cut while under tension so that the cut end is at most flush with the periphery of the anchor block; so that the possibility of the web becoming tangled with the hanging system components is eliminated or at least greatly reduced.

For the form shown in FIGS. 1 through 5, when it is desired to uncouple the web from the corkline and/or lead line, the clips 9 can be quickly cut or crushed by use of nippers. Alternatively, a hand punch can be used to punch a hole through each clip in registration with its pin 29 and thereby allow the clip to be separated from its block. New clips and, usually, a new hanging cord are used when recoupling the web to the same or a new corkline or lead line.

With reference to FIG. 1, usually the corkline floats 36 are slidable along the corkline rope 22. For use with the hanging system in accordance with the present invention, it is preferred that such floats be retained against longitudinal movement so as to prevent the floats from striking the anchor blocks and damaging or moving them. Consequently, it is preferred that a float retainer 37 of the construction shown in detail in FIGS. 6 through 10 be provided to retain the floats in position.

The retainer 37 shown in FIGS. 6 through 10 is of one-piece plastic construction with a thin, narrow, central portion or tie 38 of a length sufficient to be looped over the top of a float as shown in FIG. 6. The opposite ends 39 of the retainer are in the form of flexible clamps elongated transversely of the length of the tie 38. One end portion of each clamp has a through bore 40 including an enlarged outer section, as best seen in FIG. 7. The other end portion of each clamp has a pin 41 which, similar to construction of the clip pin 29 previously described, has an enlarged head 42 split by a transverse slot in its outer end. As diagrammatically represented in FIG. 10 and as shown in FIG. 7, the clamp ends can be bent around the corkline rope to force the enlarged pinhead through the bore 40 and clamp the corkline rope 22. As seen in FIG. 8, the portions of the retainer ends or clamps 39 engaged against the corkline rope can have ribs or teeth 43 to be embedded in the periphery of the rope and thereby assure that the clamp ends cannot be slid longitudinally of the rope.

Figure 11:
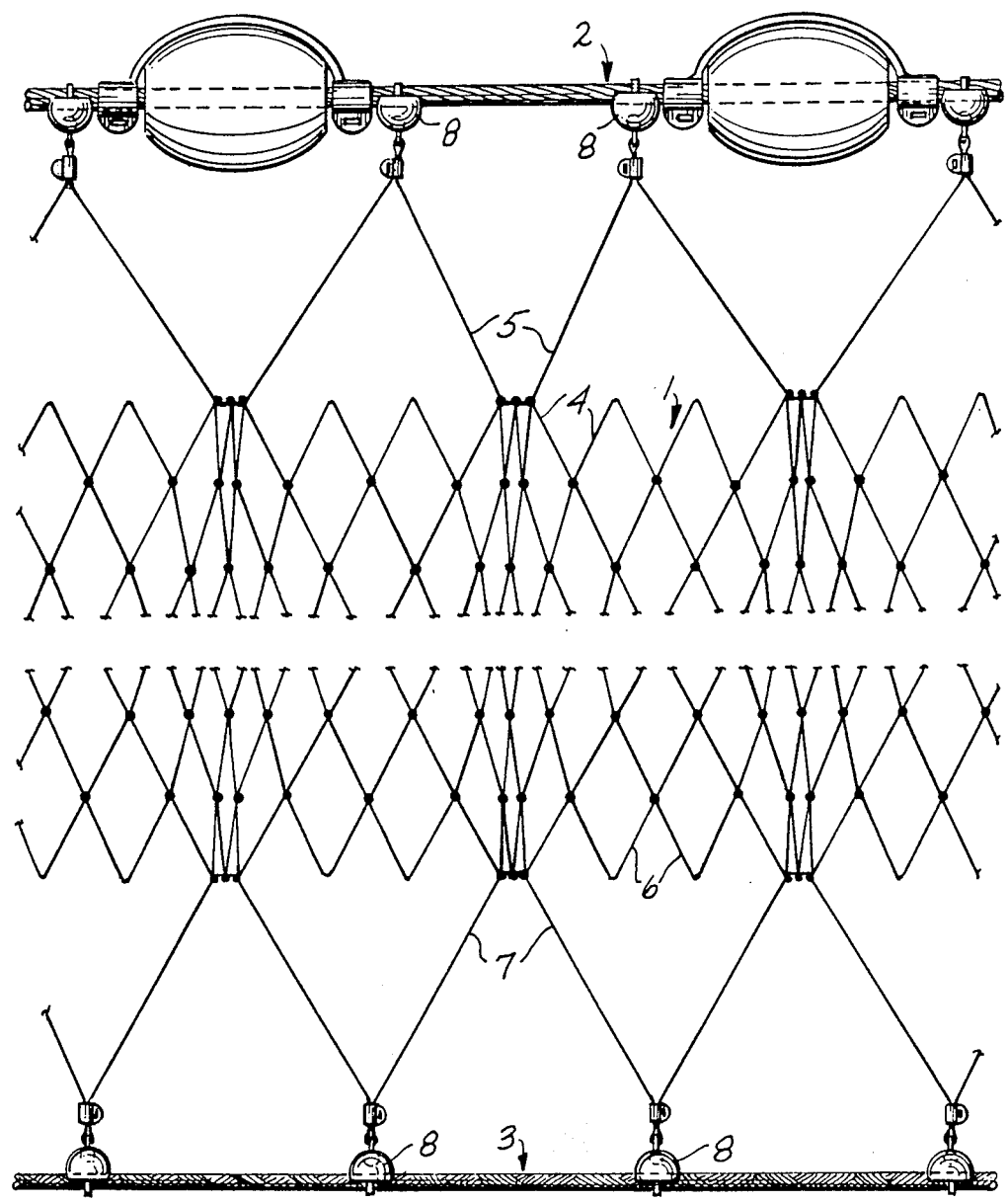
FIG. 11 is a fragmentary, somewhat diagrammatic, side elevation of a shackel of fishing gear utilizing an alternative fishnet hanging system in accordance with the present invention, similar to the system of FIG. 1 except for an alternative component, namely, an alternative hanging cord clip.
Figure 12:
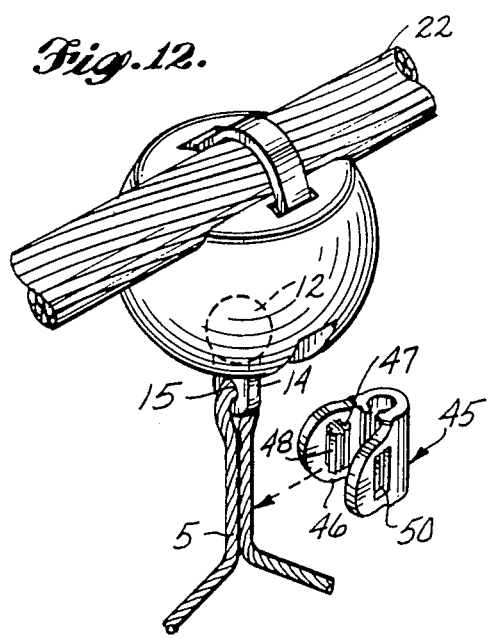
FIG. 12 is an enlarged top perspective of the alternative hanging cord clip of FIG. 11 illustrating its connection to a hanging cord.
Figure 13:
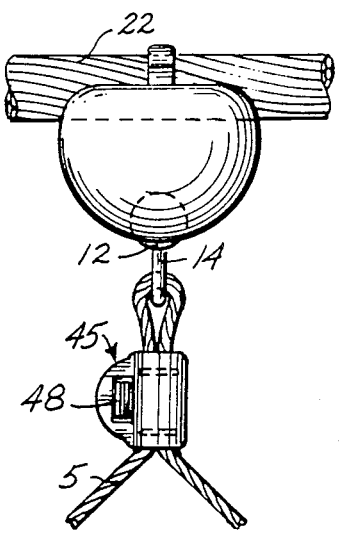
FIG. 13 is a side elevation of such clip after attachment to a hanging cord.
Figure 14:
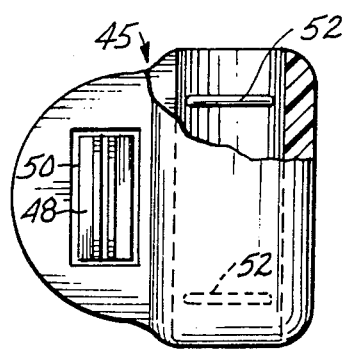
FIG. 14 is an enlarged side elevation of the clip of FIGS. 11, 12 and 13, with parts broken away.
Figure 15:
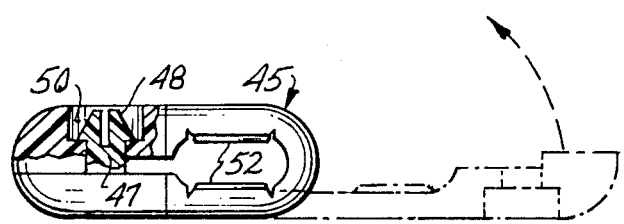
FIG. 15 is a somewhat diagrammatic end elevation of such clip with parts broken away.

The embodiment of fishnet hanging system shown in FIG. 11 uses anchor blocks 8 secured to the corkline 2 and lead line 3 and identical to the anchor blocks previously described. The hanging cords 5 and 7 are threaded through selected loops of the top and bottom selvages 4 and 6 of the web 1 in the same manner as for the previously described embodiment. As best seen in FIGS. 12 through 15, however, rather than securing the hanging cords to clips which, in turn, are secured to the connectors in the anchor blocks, each hanging cord, such as line 5, is threaded through the eye 15 of arm 14 projecting downward from the internal anchor block ball 12. A separate clip 45 is used to clamp the resulting loop of hanging cord directly below the ball arm 14. The construction of such clip 45 is very similar to the construction of clip 9 previously described in that clip 45 is of generally U shape with outward-projecting wings 46. One of such wings has the inward-projecting pin 47 with an enlarged head 48 split by a transverse slot permitting the opposite sides of the head to be squeezed together. The other clip wing has a through bore 50 for receiving the pinhead 48. The base of the clip forms an internal passage for receiving the stretches or loop of hanging cord, with inward-projecting ribs or teeth 52 that are embedded in the hanging cord when it is clamped in the clip passage to assure that the hanging cord cannot slide relative to the clip. After assembly, the web can be uncoupled from the corkline or lead line by simply cutting the hanging cord.

Figure 16:
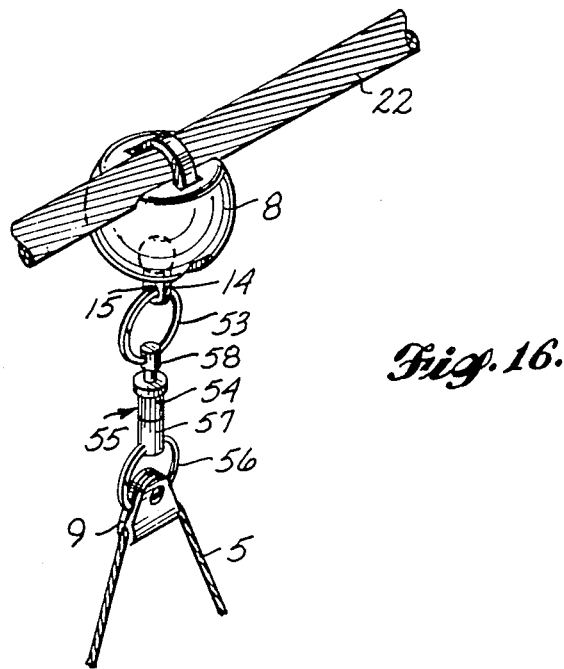
FIG. 16 is a somewhat diagrammatic, fragmentary, top perspective of another modified fishnet hanging system in accordance with the present invention.

In the embodiment shown in FIG. 16, anchor blocks 8 identical to the anchor blocks previously described are secured to the corkline and the lead line, only the corkline rope 22 being shown. An upper split ring 53 connects the eye 15 of the ball arm 14 with the upper section 54 of a conventional quick disconnect coupling 55; and a lower split ring 56 connects one of the clips 9 clamped to the appropriate hanging cord, such as line 5, with the lower section 57 of the coupling. Such coupling can be of the general type commonly used in key chains in which the upper and lower coupling sections are normally firmly coupled together but which can be separated by pressing the upper plunger 58. Consequently, the web hung by line 5 can be uncoupled from the corkline quickly and a new web to which the hanging cord clips 9, lower split rings 57 and lower coupling sections 56 already have been attached can be connected to the upper coupling sections 54 which remain attached to the anchor blocks 8.

Figure 17:
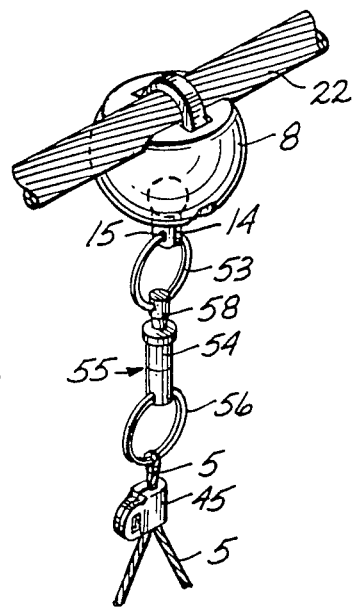
FIG. 17 is a somewhat diagrammatic, fragmentary, top perspective of yet another modified form of a fishnet hanging system in accordance with the present invention.

The general system shown in FIG. 16 also can be used with the second form of clips 45 instead of the first form of clips 9. As shown in FIG. 17, the appropriate hanging cord, such as line 5, can be threaded through the lower split ring 56 with a clip 45 clamping the loop of hanging cord at opposite sides of such ring.

I claim:

1. In mechanism for coupling a fishnet to a line, such fishnet being carried by a hanging cord, the improvement comprising the combination of an anchor block having a through bore and an arcuate cutout for receiving the line, strap means passing through said block for securing said block to the line, and means for attaching the hanging cord to said anchor block, said attaching means including a connector having a first portion fitted in said bore and an arm portion projecting from said bore, said arm portion of said connector having an eye, and said attaching means further including a clip for clamping the hanging line, said clip having a pin fittable in said eye for connecting said clip and the hanging line to said connector.

2. In mechanism for coupling a net to a cylindrical length, such net being carried by a hanging cord, the improvement comprising several anchor blocks of rigid material each having a bore opening at the exterior thereof, means for clamping said blocks to the cylindrical length at fixed locations spaced lengthwise of the cylindrical length, and several separate rigid connectors, one for each of said anchor blocks, each of said connectors having a first portion fitted in the bore of its block and a rigid arm portion projecting from such bore, said connectors being swingable relative to their blocks, respectively, said arm portion of each connector having an eye, and including several clips, one for each connector, for clamping the hanging line, each clip having a pin fittable in the eye of its connector for connection of the hanging cord to such projecting arm portion.

3. In mechanism for coupling a net to a cylindrical length, such net being carried by a hanging cord, the improvement comprising the combination of an anchor block having a through bore and an arcuate cutout for receiving the cylindrical length, strap means passing through said block for securing said block to the cylindrical length, and means for attaching the hanging cord to said anchor block, said attaching means including a connector having a first portion fitted in said bore and an arm portion projecting from said bore, said arm portion of said connector having an eye, and said attaching means further including a clip for clamping the hanging line, said clip having a pin fittable in said eye for connecting said clip and the hanging line to said connector.

4. In mechanism for coupling a net to an elongated cylindrical length, the improvement comprising several anchor blocks of rigid material each having a bore opening at the exterior thereof, means for clamping said blocks to the cylindrical length at fixed locations spaced lengthwise of the cylindrical length, several separate connectors, one for each of said blocks, each of said connectors having a rigid portion fitted in the bore of its block and retained therein, said connectors having portions extending from their blocks for connection to the net to couple the net to said blocks, each block having a concave cutout opening at the exterior thereof for receiving the cylindrical length by movement of the cylindrical length transversely of its length into said cutout leaving a side of said cylindrical length exposed and through slots at opposite sides of said cutout, said clamping means including a strap for each block having opposite end portions insertable in said slots, respectively, so as to encircle the exposed side of the cylindrical length and means limiting movement of said strap through one of said slots, each block having ratchet means permitting movement of its strap lengthwise through the other of said slots in a direction to tighten said strap around the cylindrical length and thereby clamp its block to the cylindrical length but preventing movement of the strap lengthwise through such other slot in the opposite direction to loosen the strap.

5. In the mechanism defined in claim 4, the bore of each block having opposite end portions opening, respectively, at the exterior of the block and into the concave cutout.

* * * * *